United States Patent [19]

Sze et al.

[11] 4,029,474

[45] June 14, 1977

[54] COAL LIQUEFACTION REACTOR DISTRIBUTION SYSTEM

[75] Inventors: Morgan C. Sze, Upper Montclair; Harold B. Kohn, Cedar Grove, both of N.J.

[73] Assignee: The Lummus Company, Bloomfield, N.J.

[22] Filed: June 3, 1976

[21] Appl. No.: 691,916

[52] U.S. Cl. .............................. 23/285; 23/271 R; 23/288 E; 261/114 A; 261/123
[51] Int. Cl.² ...................... B01J 8/00; C10G 1/06
[58] Field of Search ................ 23/283, 285, 252 R, 23/270 R, 271 R, 271 D, 288 E; 208/8, 10; 261/114 A, 123; 196/14.52, 155

[56] References Cited

UNITED STATES PATENTS

| | | | |
|---|---|---|---|
| 1,651,354 | 12/1927 | Alexander | 196/14.52 X |
| 2,385,200 | 9/1945 | Friedel | 23/285 X |
| 2,680,675 | 6/1954 | Groebe | 23/283 |
| 2,707,163 | 4/1955 | Thibaut | 208/10 X |
| 2,751,425 | 6/1956 | Rupp | 23/285 X |
| 3,540,995 | 11/1970 | Wolk et al. | 208/10 |
| 3,972,966 | 8/1976 | Lund et al. | 261/114 A X |

Primary Examiner—Joseph Scovronek
Attorney, Agent, or Firm—Wallace F. Neyerlin; Michael Klotz; Franklin D. Wolffe

[57] ABSTRACT

A multi-channelled distribution network supplies hydrogen such that separated flows of hot coal paste and heated hydrogen meet in the restricted confines of a multitude of inverted caps to promote turbulent intermixing before the mixture enters the active bed of a coal liquefaction reactor.

11 Claims, 6 Drawing Figures

COAL LIQUEFACTION REACTOR DISTRIBUTION SYSTEM

BACKGROUND OF THE INVENTION

The present invention relates generally to a process of coal liquefaction and more particularly to an apparatus for effective distribution of hydrogen into a coal paste in the liquefaction reactor.

Coal can be converted to valuable products by subjecting coal to solvent extraction, with the addition of hydrogen, to produce a mixture of coal extract and undissolved coal residue, the residue including undissolved extractable carbonaceous matter, fusain and mineral matter or ash. The undissolved coal residue is separated from the coal extract and valuable products are recovered from the coal extract.

In the process, ground or pulverized coal, generally bituminous, sub-bituminous or lignite, is introduced into a coal solvation and slurrying zone along with a coal liquefaction solvent. The solvent is added to the pulverized material in an amount sufficient to effect the subsequently desired liquefaction and produces a coal paste. The paste is introduced into a coal liquefaction zone wherein, with application of heat and pressure the coal is converted to liquid products. The process in the liquefaction zone, known in the art, may be catalytic or non-catalytic and may be effected in the presence or absence of added hydrogen, but preferably in the presence of added hydrogen. This hydrogenation, as known in the art, increases the recovery of coal products and also reduces the sulfur and nitrogen content of the recovered liquid coal product. The liquefaction is preferably effected in an upflow ebullated bed e.g., as described in U.S. Pat. No. 2,987,465.

The liquefaction or digestion of the coal in the pasting solvent is effected at temperatures and pressures, which generally range from about 700° F. to about 1000° F. and with a pressure up to 10,000 psia. The reaction conditions for effecting liquefaction of the coal are well known in the art and form no part of the present invention.

The insoluble material in the liquefaction zone is then separated from the coal extract to provide a coal extract essentially free of insoluble matter.

There is a need for new and improved techniques in such a coal liquefaction process in order to provide an economic process for producing clean fuel from coal. A difficulty occurring in present systems relates to the proper introduction of hydrogen into a bed of coal paste. Uniform distribution of hydrogen within the paste, maintenance of proper quantitative ratios of materials, and adequate mixture of hydrogen and paste present problems which affect the overall operational efficiency of the apparatus and process.

SUMMARY OF THE INVENTION

In the liquefaction reactor of this invention heated coal paste and heated hydrogen under pressure are distributed into and active liquefaction bed through a multiplicity of common inlets. A dished head or partition separates the supply of heated coal paste in the plenum below from the active liquefaction bed above. A multiplicity of small diameter vertical tubes protrude through the head to permit upward flow of paste from the plenum. Each vertical tube is topped with a cap, similar to a bubble cap, having a hydrogen supply pipe within the cap and aligned concentrically with the paste feed tube. The hydrogen and coal paste make first intermixing contact within the cap at the discharge openings of the hydrogen pipes where depth of paste is low and velocities are high; intermixing of paste and hydrogen is enhanced. The hot hydrogen supply manifolds and tubes routed through the liquefaction bed furnish heat to the active bed.

OBJECTS OF THE INVENTION

An object of the present invention is to provide effective mixing contact between heated hydrogen and hot coal paste.

A further object of the present invention is to provide an extended area for contact between hydrogen and coal paste.

Another object of the present invention is to provide an apparatus which maintains separation of materials, coal paste and active bed, prior to the introduction of hydrogen.

Yet another object of this invention is to provide an apparatus wherein flow rates of coal paste and hydrogen are independently controllable.

Still another object of this invention is to provide a system of distribution which is mechanically simple.

Other objects, advantages and novel features of the present invention will become apparent from the following detailed description when considered in conjunction with the accompanying drawing, in which.

Figure 1:
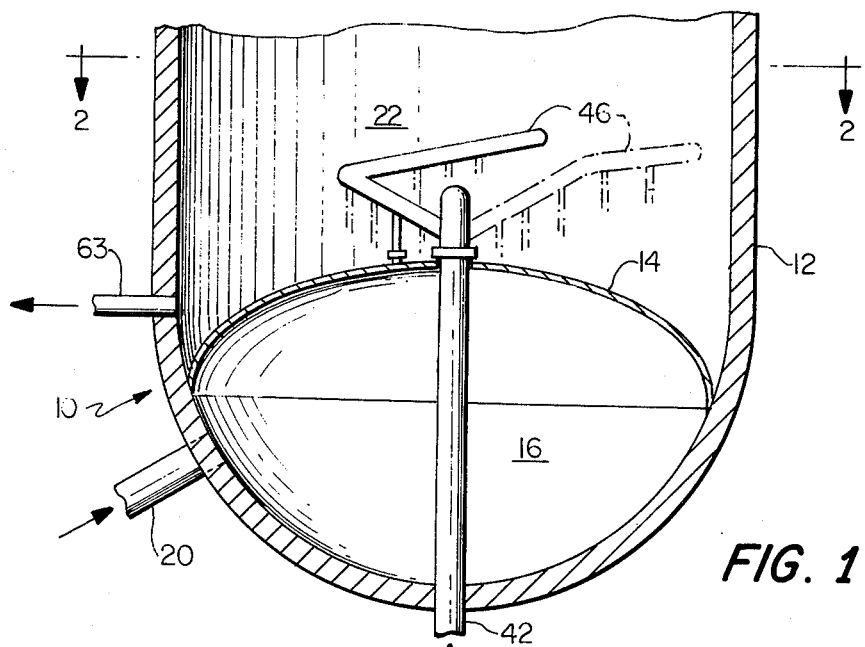
FIG. 1 is a segmented elevational view with parts omitted of the liquefaction reactor of this invention taken along the section 1—1 of FIG. 2.

The liquefaction reactor 10 of this invention (FIGS. 1 and 2) is comprised of a rigid generally cylindrical outer shell 12 having an hemispherical lower end and having an upwardly dished, or domed, head 14 which partitions the interior of the shell 12 to provide a plenum chamber 16 below the head 14 substantially separate from the space 22 above the head. The plenum 16 is filled with hot coal paste comprised of crushed coal mixed with a solvent, fed continuously into the plenum 16 via pipe 20 and maintained under pressure by pumping means (not shown).

Figure 3:
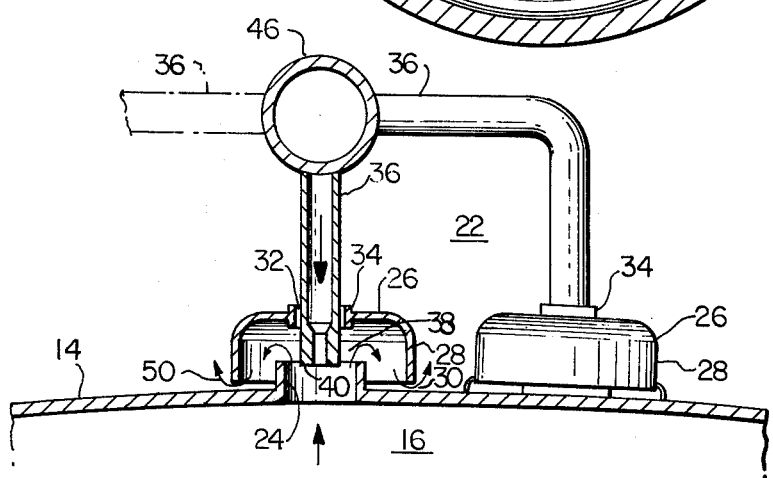
FIG. 3 is a cross-section view to an enlarged scale of an intermixing cap taken along the section 3—3 of FIG. 2.

Above the head 14 is the active bed 22 wherein the solvent in the paste reacts with the coal in the presence of agents including hydrogen, all in the manner known in the art. A plurality of open tubes 24 (FIG. 3) integral with the head 14 rise above the surface of the head 14 and provide communicating passage between the plenum chamber 16 below and the active bed 22 above. An individual intermixing cap 26, generally shaped like an inverted tea cup, rests above and is concentric with each tube 24, the depending skirt 28 of the intermixing cap 26 extending adjacent the upper surface of the head 14 and having a small clearance 30 therebetween.

A hole 32 in the intermixing cap 26 has an inner collar 34 circling about its periphery; the hole 32 allows entrance therethrough of a hydrogen tube 36 for purposes more fully explained hereinafter. There is a sliding fit between the tube 36 and the aforesaid collar 34 and the hydrogen tube outlet is substantially at the same level and concentric with the outlet of the paste riser tube 24. The diameter of the hydrogen tube 36 is less than the diameter of the paste riser tube 24 such that a generally annular flow passage 38 is present between the tubes. The internal channel of the hydrogen tube 36 is reduced near the outlet end 40 to increase the pressure drop, increase flow velocity and assure uniform distribution of hydrogen gas in the coal paste.

An elongated hydrogen supply pipe 42 passes through the wall of the outer shell 12 at its lower extremity, and rises vertically passing through the plenum chamber 16, and through the dished head 14 to terminate in the active bed chamber 22 in a network comprised of a plurality of tubular manifolds 46. Each of these tubular manifolds 46 branches radially from the central hydrogen supply pipe 42 and bends proximate the wall of the outer shell 12 to further extend in generally chordal relationship with the shell wall 12. A plurality of hydrogen tubes 36 individually extend from the bottom and sides of the manifolds 46 and connect to the intermixing caps 26 above the head 14. Heated hydrogen entering the supply pipe 42 under pressure is distributed among the plurality of intermixing caps 26 via the network of manifolds 46 and connected tubes 36.

Figure 2:
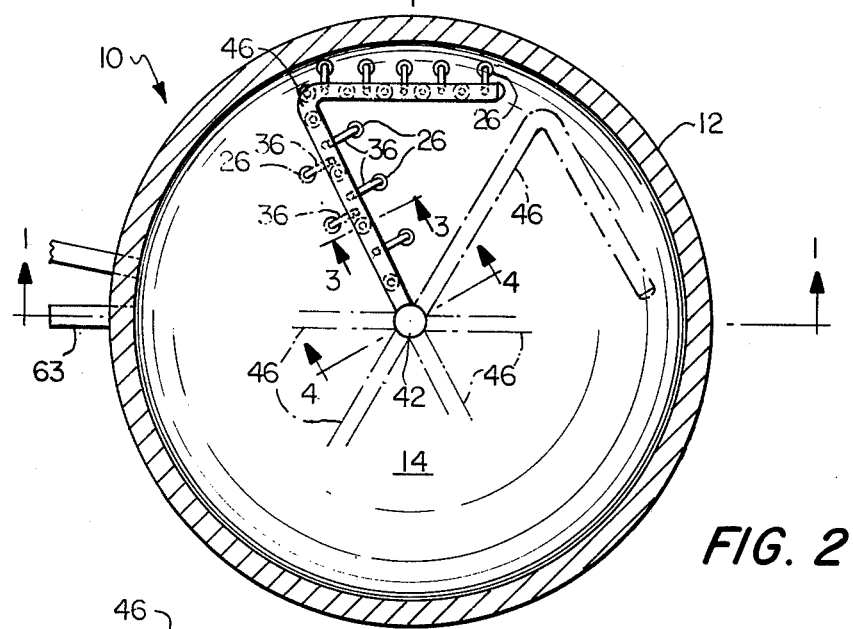
FIG. 2 is the plan view with parts omitted of the liquefaction reactor taken along the section 2—2 of FIG. 1.
Figure 4:
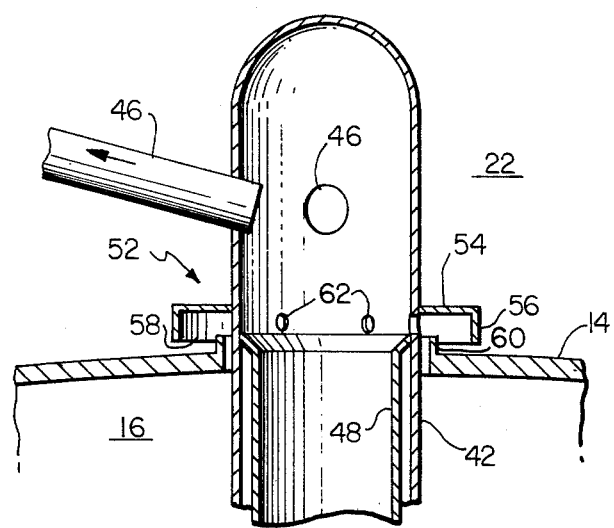
FIG. 4 is a cross-section view to an enlarged scale of the sliding joint between the head and hydrogen supply pipe taken along section 4—4 of FIG. 2.

The number of tubes 24 through the head 14 and intermixing caps 26 in a particular embodiment is generally in proportion to the flow density, pounds per hour, of coal paste to be processed. In operation, the central pipe 42, manifolds 46 and tubes 36 above the head 14 are submerged in the active bed 22 and heat is transferred from the heated hydrogen in the tubes 36 into the active bed 22. Therefore, the number of manifolds 46 and the routing of tubes 36 between manifolds 46 and caps 26, and the pattern of distribution of tubes 24 and caps 26 over the head 14 are selected to produce any desired temperature profile in the active bed as the liquefaction process requires. FIGS. 1 and 2 partially illustrate a distribution network having six symmetrically arranged manifolds 46. However, for the sake of clarity in the drawing, only two manifolds 46 appear in FIG. 1; and in FIG. 2, the six manifolds 46 are only partially indicated. Insulation in the form (FIG. 4) of a double wall 48 minimizes the transfer of heat from the hydrogen supply pipe 42 into the coal paste in the plenum chamber 16 which heat otherwise would tend to form undesirable solid clinkers in the paste.

In operation of the reactor 10 the coal paste, under pressure, is forced upward from the plenum chamber 16 through the dished head 14 via the plurality of tubes 24 piercing the head 14. At the discharge of the tubes 24, the hot coal paste mixes within the inverted cap 26 with a pressurized stream of heated hydrogen entering through the hydrogen tubes 26. The mixture of coal paste and hydrogen, turbulated by the high velocities and reversing turns within the intermixing cap 26 enters the active bed 22 via the clearance 30 between the cap skirt 28 and the head 14. The path of the mixture downstream of the region of first contact between hydrogen and coal paste within the cap 26 is generally indicated by the arrow 50.

The manifolds 46 slope upwardly away from the points of connection to the hydrogen supply pipe 42 so that any paste or material from the active bed which inadvertently enters a manifold 46 via a tube 36 drains to the central pipe 42 when the reactor 10 is inoperative.

A sliding joint 52 where (FIG. 4) the vertical hydrogen supply pipe 42 passes through the dished head 14 allows for expansion, contraction and movement of members due to pressure and temperature variations. An annular cap 54 is fixedly attached to the vertical pipe 42 and a peripheral depending skirt 56 extends to provide an annular clearance gap 58 between the head 14 and the skirt 56. A fixed vertical collar 60 circles the opening in the head 14 and a plurality of holes 62 in the pipe 42 communicate between the hydrogen supply pipe 42 and the annular cap 54. Thus, the upflow, if any, of pressurized coal paste from the plenum 16 through the clearance between the collar 60 and the pipe 42 is mixed with hydrogen prior to entry via the clearance gap 58 into the active bed 22.

The discharge port 63 located above the dished head 14 permits periodic draw-off of insoluble materials settling within the active bed 22.

Figure 6:
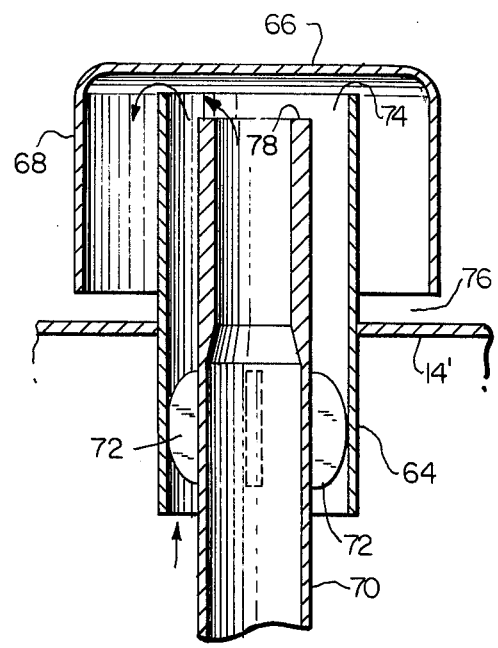
FIG. 6 is a cross-sectional view to an enlarged scale of an intermixing cap in the alternative embodiment of FIG. 5.
Figure 5:
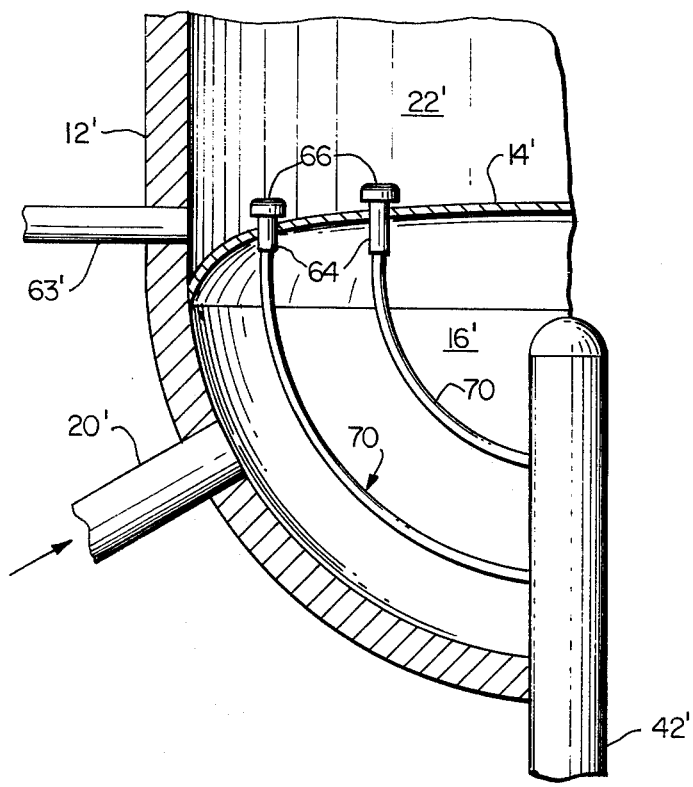
FIG. 5 is a fragmented sectional view in elevation of an alternative embodiment of this invention.

In an alternative embodiment (FIGS. 5 and 6) of this invention, both the hydrogen and coal paste are distributed from below the head. The dished head 14' is pierced by a plurality of vertical riser tubes 64 extending both above and below the head 14' (Corresponding parts of the alternative embodiment are indicated by a prime (') marking). Each riser tube 64 is surmounted with a cap 66 having a depending skirt 68 extending adjacent to the head 14'. The hydrogen supply pipe 42' enters through the reactor shell 12' and terminates within the coal paste plenum 16'. A hydrogen tube 70 rises concentrically within each of the plurality of paste riser tubes 64 and discharges hydrogen beneath the cap 66 at a level substantially coplanar with the discharge of the paste riser tube 64. Guide tabs 72 attached externally to the hydrogen tubes 70 center the hydrogen tubes 70 within the riser tubes 64. The hydrogen tubes extend from the cap 66 to the hydrogen supply pipe 42' and provide a flow path therebetween.

In operation, hot coal paste under pressure is forced out of the plenum 16' and upward through the riser tubes 64 to the caps 66 where the paste intermixes with heated hydrogen furnished under pressure through the hydrogen tubes 70. The mixture of paste and hydrogen flows through the circular gap 74 between the riser tube 64 and the cap 66 and then through the circular gap 76 between the skirt 68 and the surface of the dished head 14'. The internal channel of the hydrogen tube 70 is reduced near the outlet end 78 to increase the pressure drop, increase flow velocity and assure uniform distribution of hydrogen gas in the coal paste.

In both embodiments described above, the feed rate and pressure of both coal paste and hydrogen may be independently controlled by individual pumping means (not shown).

What is claimed is:

1. A reactor for the liquefaction of coal comprised of:
   a container divided by a partitioning head into a first and a second chamber;
   a first plurality of tubes through said partitioning head communicating between said chambers and extending from said partitioning head into said second chamber;

a plurality of circular caps each of said caps individually positioned adjacent the extended end of one of said first tubes, concentric thereto, and spaced therefrom, said caps having a greater diameter than said first tubes;

a second plurality of tubes each of said second tubes concentrically aligned with one of said tubes, the end of each said second tube adjacent the extended end of said first tube;

inlet means for entry of pressurized material into said first chamber; and inlet means for supplying pressurized material to said second plurality of tubes.

2. The liquefaction reactor of claim 1 wherein each of said second tubes passes through one of said caps, the discharge opening of said second tube substantially opposing the discharge of said first tube.

3. The liquefaction reactor of claim 2 wherein the diameter of said second tube is less than the diameter of said first tube.

4. The liquefaction reactor of claim 1 wherein a circular skirt extends from each of said caps toward said partitioning head and is spaced therefrom.

5. The liquefaction reactor of claim 1 wherein said inlet means for supplying pressurized material to said second plurality of tubes is comprised of a supply pipe entering through the wall of said container and distribution means in said first chamber between said pipe and said second tubes.

6. The liquefaction reactor of claim 2 wherein said inlet means for supplying pressurized material to said second plurality of tubes is comprised of a supply pipe entering through the wall of said container and distribution means in said second chamber between said pipe and said second tubes, said distribution means and said second tubes providing a heat transfer relationship between materials in said second chamber and materials in said distribution means and second tubes.

7. The liquefaction reactor of claim 6 wherein said distribution means in said second chamber are comprised of a plurality of manifolds between said supply pipe and said second tubes.

8. The liquefaction reactor of claim 1 wherein said second chamber is above said first chamber.

9. The liquefaction reactor of claim 2 wherein the connections between said caps and said second tubes are sliding connections, whereby expansion, contraction and movements due to pressure and temperature changes are compensated for.

10. The liquefaction reactor for claim 6 wherein said supply pipe passes through said partitioning head, the connection therethrough is a sliding connection; a circular flange extends radially from said pipe in said second chamber adjacent said partitioning head; and communicating passage through the wall of said pipe located between said flange and said partitioning head connects said pipe to said second chamber, said supply pipe being thermally insulated in said first chamber.

11. The liquefaction reactor of claim 10 wherein a skirt extends from said flange toward said partitioning head and is spaced therefrom.

* * * * *